United States Patent [19]

Smith et al.

[11] Patent Number: 5,295,184
[45] Date of Patent: Mar. 15, 1994

[54] DYNAMICALLY ADJUSTABLE CALL PACING SYSTEM

[75] Inventors: B. Scott Smith, Londonderry; Gerry L. Pearson; Frederick P. Kneipp, both of Nashua, all of N.H.

[73] Assignee: Davox Corporation, Billerica, Mass.

[21] Appl. No.: 708,050

[22] Filed: May 30, 1991

[51] Int. Cl.5 .......................... H04M 3/46; H04Q 3/64
[52] U.S. Cl. ...................................... 379/216; 379/92; 379/218; 379/266
[58] Field of Search ................. 379/216, 92, 266, 265, 379/309, 67, 88, 69, 386, 218

[56] References Cited

U.S. PATENT DOCUMENTS

| 4,201,896 | 5/1980 | Bower et al. | 379/67 |
| 4,599,493 | 7/1986 | Cave | 379/247 |
| 4,730,187 | 3/1988 | Menich et al. | 340/825.5 |
| 4,792,849 | 12/1988 | McCalley et al. | 358/86 |
| 4,829,563 | 5/1989 | Crockett et al. | 379/309 |
| 4,843,633 | 6/1989 | Menich et al. | 455/33 |
| 4,858,120 | 8/1989 | Samuelson | 364/401 |
| 4,881,261 | 11/1989 | Oliphant et al. | 379/215 |
| 4,893,307 | 1/1990 | McKay et al. | 370/94.1 |
| 4,933,964 | 6/1990 | Girgis | 379/67 |
| 4,941,168 | 7/1990 | Kelly, Jr. | 379/69 |
| 5,155,763 | 10/1992 | Bigus et al. | 379/113 |

Primary Examiner—Thomas W. Brown
Attorney, Agent, or Firm—Daniel J. Bourque

[57] ABSTRACT

A dynamically adjustable call pacing system computes the average time a call spends on hold. An Average Hold Time is computed and dynamically updated by monitoring the number of current calls on hold and the amount of time by which current calls on hold exceed the average time on hold. Before adjusting the line activation time which controls the frequency at which idle telephone lines are released to a call initiator, the call pacing system determines the sum of the adjustments which have been previously made to the line activation time, and uses this sum to minimize large fluctuations in Average Hold Times.

16 Claims, 7 Drawing Sheets

DYNAMICALLY ADJUSTABLE CALL PACING SYSTEM

FIELD OF THE INVENTION

This invention relates to automated telephone systems and more particularly, to a system for dynamically monitoring and regulating the pace at which outbound calls are initiated by such an automated telephone system.

BACKGROUND OF THE INVENTION

Automated telephone systems are not extensively used to both place and receive telephone calls. For example, airline reservation systems and banks may utilize the inbound or call receiving features of the automated telephone system, while marketing groups and credit collection departments will utilize the outbound calling features of the system.

Users of the outbound or call dialing feature of an automated telephone system desire to optimize system performance and ensure that all available operators constantly have a call to answer, while simultaneously ensuring than an answered call will not be inconvenienced or lost due to being placed on hold for an extended period of time. Additionally, users of such systems know that a percentage of the calls dialed will not be answered. Consequently, more calls are dialed then there are operators or agents.

The most basic prior art call pacing systems, therefore, simply maintain a predetermined ratio of lines dialing to operators on duty. This ratio is generally displayed to a supervisor who must constantly monitor and adjust the ratio based upon the length of operator-to-client connect time, a higher number of answered calls, and the number of operators available. Accordingly, this method has proven to be a very non-uniform, manual call pacing system.

Current call pacing systems typically monitor historical call hold activity. Monitoring the historical call hold activity includes monitoring the percentage of calls that were placed on hold. That is, the number of calls that were put on hold out of all the calls that were answered. Based on the percent on hold, the supervisor or the system reduces the call dialing pace.

Prior art systems which monitor only historical call hold activity do not, however, account for and monitor the amount of time a current call is spending on hold. Neither do they account for customer hold discomfort. For example, it is far worse to have a low percentage of callers kept on hold for 20 seconds then for a high percentage of calls to be kept on hold for only 2 seconds. In addition, merely accounting for the average amount of time that previously answered calls spent on hold, also called On Hold Time Average, does not account for current calls on hold, as well as for the fact that many minutes pass from the time an adjustment is made in the dialing frequency to the time that results are seen as a change in on hold time average. Accordingly, large fluctuations in dialing frequency result in numerous idle operators if calls are paced too slowly, and a dramatically increased on hold time averages and many lost calls if calls are paced too quickly.

Further, an additional problem facing all systems is that the on hold time average will fluctuate from user-to-user, site-to-site and campaign-to-campaign and thus, must be constantly monitored and manually updated.

SUMMARY OF THE INVENTION

Accordingly, the present invention features a dynamically and automatically adjustable call pacing system, for regulating the frequency at which idle telephone lines are coupled to a telephone call initiator of an automated telephone system. In addition to determining the average time that answered calls spend on hold, the dynamically adjustable call pacing system of the present invention monitors and determines whether current calls on hold exceed the average time on hold. Thus, real time adjustments may be made to the call pacing system based upon this information even before calls leave the hold queue.

In addition to monitoring the number of available operators, the call pacing system of the present invention determines the sum of a predetermined number of adjustments which have been previously made to the line activation time of the call pacing system, and which have in all probability not yet been reflected in an actual change to the Average Hold Time. Thus, the call pacing system of the present invention takes into account previously made changes or adjustments before computing the current change to be made to the telephone line activation time, thus eliminating large fluctuations in Average Hold Time and the associated problems.

DESCRIPTION OF THE DRAWINGS

These, and other features of the present invention will be better understood by reading the following detailed description, taken together with the drawings in which.

DETAILED DESCRIPTION OF THE INVENTION

Figure 1:
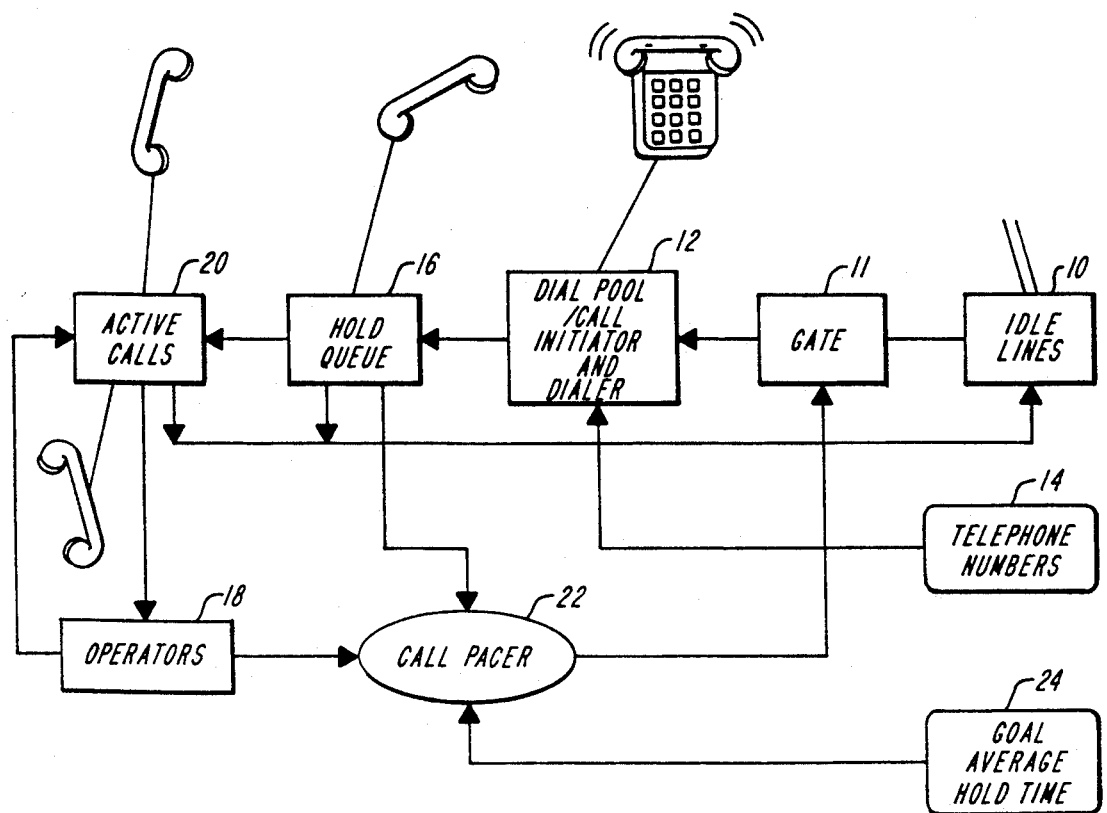
FIG. 1 is a block diagram of a portion of an automated telephone system showing the dynamically adjustable call pacing system of the present invention.

A portion of an automated telephone system incorporating the dynamically adjustable call pacing system of the present invention is shown in FIG. 1 wherein the automated telephone system includes a line pool which includes a plurality of idle telephone lines 10 on which may be placed a corresponding plurality of outgoing telephone calls. The idle telephone lines are selectively gated and coupled to call initiator/dial pool 12 by telephone line gate or coupler 11. Although the dial pool may be controlled by making sure the number of lines dialing in the dial pool 12 corresponds to the needs of the pacing algorithm, in the preferred embodiment, the call pacer 22 regulates the gate 11 which functions like an interval timer, providing a Line Activation Time (LAT) which controls the release of idle lines to the dial pool and thus, more evenly distributes the dial start times. For each LAT expiration, a call control program will put an idle line 10 into the dial pool 12, and will continue to dial from a source of telephone numbers 14, until it obtains an answer on the line. The answered call is then inserted into the Hold Queue 16 and an operator requested from operator pool 18.

The call pacing system according to the present invention thus allows for varied types of call control programs, such as programs which may not immediately dial, or may not immediately request an operator upon getting an answer, or may not even request an operator for each answer such as when calls can be handled without an operator. In fact, one advantage of the system of the present invention is the lack of knowledge required about what is happening in the dial pool/call initiator and dialer 12. The call pacing algorithm only needs to know the number of line activations outstanding, and not detailed information from the dialer concerning dialed lines, answered or unanswered lines, etc.

In one embodiment, the number of line activations outstanding is the number of lines dialing in the dial pool, whereas in the preferred embodiment, the number of line activations outstanding is the number of expired Line Activation Times which have not yet resulted in a request for an operator.

Upon detecting a call which has been answered by a human and which requires operator assistance, call initiator/dial pool 12 couples the corresponding telephone line to hold queue 16. If the call is terminated before the call leaves the hold queue, the telephone line is returned to the idle lines pool 10.

Upon detecting an available operator from among the operator pool 18, a call from the hold queue 16 is connected to one of the available operators and placed in the active call category 20. Operator pool 18 keeps track of both the total number of operators in the operator pool, as well as the number of currently available operators which may be connected to a call on hold. Upon completion of the call, the available operator returns to the operator pool 18 while the telephone line returns to the idle line pool 10.

The dynamically adjustable call pacer 22, according to the present invention, is responsive to hold status information from hold queue 16, to the number of available operators from the operator pool 18, and to a "goal" Average Hold Time 24, for controlling the frequency or time of telephone line gate 11 which in turn gates or controls the frequency at which idle lines from idle line pool 10 are released to call initiator/dial pool 12 for subsequent use by a Call Control Program and outbound call initiation.

Figure 2:
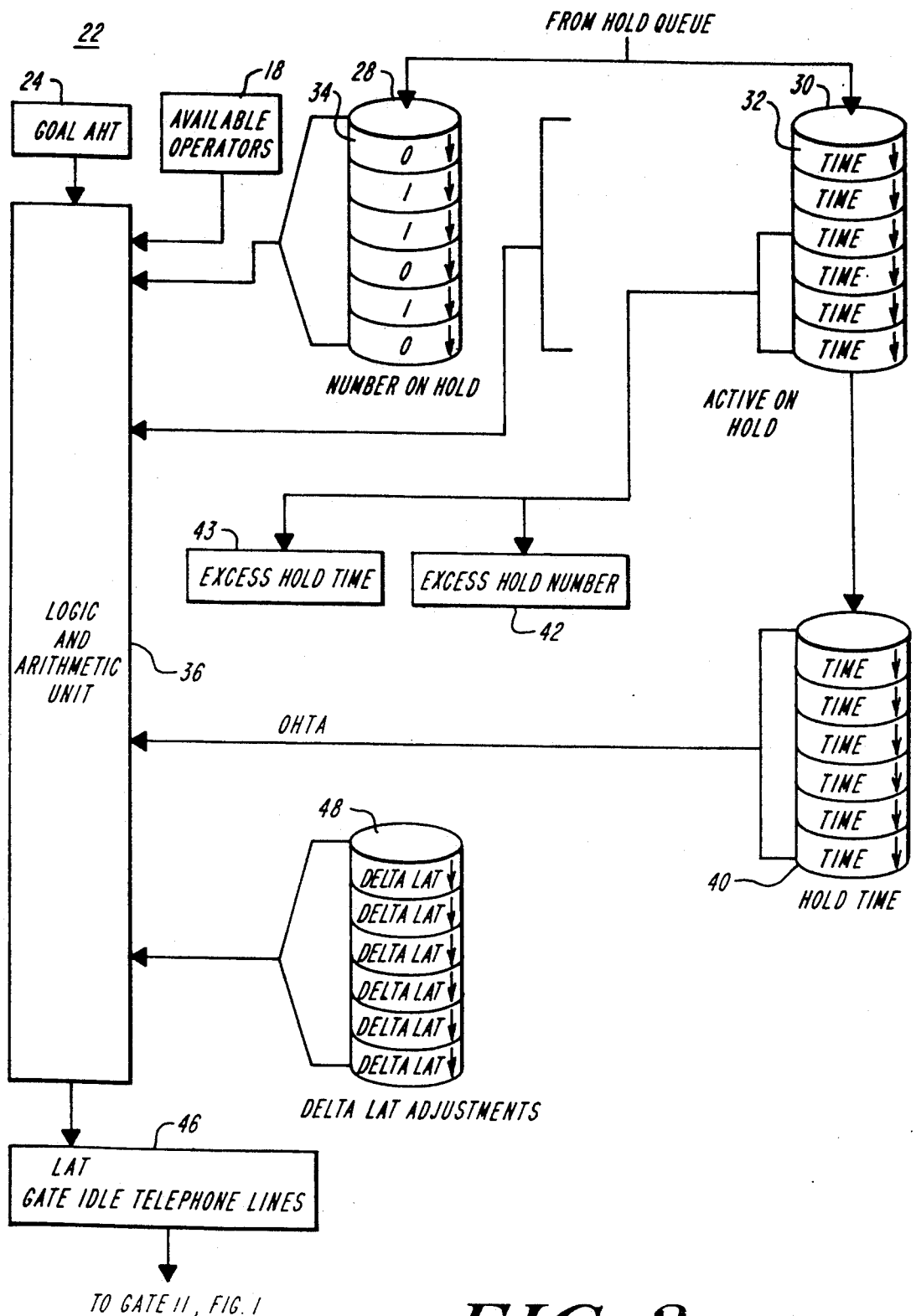
FIG. 2 is a more detailed block diagram of the dynamically adjustable call pacing system of the present invention.

The dynamically adjustable call pacing system 22 is shown in greater detail in FIG. 2 and includes a Number On Hold register 28, a Hold Time Register 40, and an Active On Hold Time register 30. Registers 30 and 28 receive information directly from the hold queue when the calls are initially placed in the hold queue. Register 40 receives call hold time information when the calls exit the hold queue.

The Number On Hold register 28 is a preset length historical type register. Each location in the Number On Hold register contains an indication as to whether or not an associated answered call was placed on hold or routed directly to an available operator. Typically, the Number On Hold register 28 includes 16 to 24 locations for storing 16 to 24 of the most recent of such information. As shown in the example in FIG. 2, a "1" in the Number On Hold register 28 indicates that the associated connected call was placed on hold, while a "0" indicates that the associated call was routed directly to an available operator.

Active On Hold Time Register 30 includes a variable number of storage locations in which is stored the elapsed amount of time of each call currently on hold. Each time record in Active Hold Time Register 30 corresponds to one connected call which is currently on hold.

Hold Time Register 40 is a present length, historical type register. For each call that leaves the Hold Queue due to hang up or connection to an operator, its elapsed hold time is moved from the Active On Hold Time register 30 to a location in the Hold Time register 40. Typically, Hold Time Register 40 includes 16 to 24 locations for storing 16 to 24 of the most recent of such time indicators.

Both the Number On Hold Register 28 as well as Hold Time register 40 are coupled to, and can be accessed by, logic and arithmetic unit 36 of the call pacing system 22. From the Number On Hold register 28, the logic and arithmetic unit 36 can compute the percentage of calls which are placed on hold by merely dividing the number of calls actually placed on hold by the "size" or total number of calls in the Number On Hold register.

Access to Hold Time Register 40 allows logic and arithmetic unit 36 to determine the sum of all of the times in the Hold Time Register. The sum of the times in the Hold Time Register 40, divided by the size of the register, results in the OHTA (On Hold Time Average) which is a measure of the average amount of time that calls remained on hold. This On Hold Time Average is utilized, in addition to other factors, to compute a measure of the amount of time that a call will spend on hold, also called the Average Hold Time (AHT). The Average Hold Time is utilized to control the call pacing via the Line Activation Time (LAT).

The hold times stored in the Active On Hold Time register 30, are monitored to determine if one or more of the hold times in the Active On Hold Time register exceed the previously computed OHTA. If one or more of the hold times exceed the previously computed OHTA, an indication of excess time is generated and stored in Excess Hold Time register 43 and Excess Hold Number register 42.

Excess Hold Number register 42 stores the sum of the total number of calls which have exceeded the previously computed OHTA. Excess Hold Time register 43 contains the sum of times in Active On Hold storage locations 30 which have exceeded the previously established OHTA.

Excess Hold Number and Time registers 42 and 43 allow the dynamically adjustable call pacing system of the present invention to immediately track and account for calls which are currently on hold and which are currently exceeding the previously computed On Hold Time Average. This data is then used to update the Average Hold Time before calls on hold leave the hold queue.

Utilizing information from the Number On Hold register 28, the Hold Time Register 40, and the Excess Hold Number and Time Registers 42 and 43, the dynamically adjustable call pacing system computes an updated Average Hold Time (AHT). Utilizing the updated Average Hold Time, the call pacing system then utilizes the "goal" Average Hold Time established by the user and the number of available operators, to generate a Delta line activation time (LAT) adjustment 46 to Telephone Line Gate 11, which controls the frequency at which idle telephone lines are gated from the idle lines pool 10 to the call initiator/dial pool 12.

To account for the inherent latency between the time that the call pacing system adjusts the line activation time signal and the time in which the change manifests itself as a change in Average Hold Time, and therefore to reduce large fluctuations in Average Hold Time, the system stores each change to the line activation time in a Delta Line Activation Time (Delta LAT) Adjustment register 48.

The Delta LAT Adjustments register 48 is a variable length historical type register. Its length corresponds to the number of Line Activation Outstanding.

Thus, when computing an updated delta value to add to the current line activation timer value, the system accounts for previous adjustments to the value of the line activation time by summing all of the values in the delta line activation time adjustment register 48 and subtracting that value from the formula which is used to compute the new line activation time value as will be further detailed herein.

Figure 3:
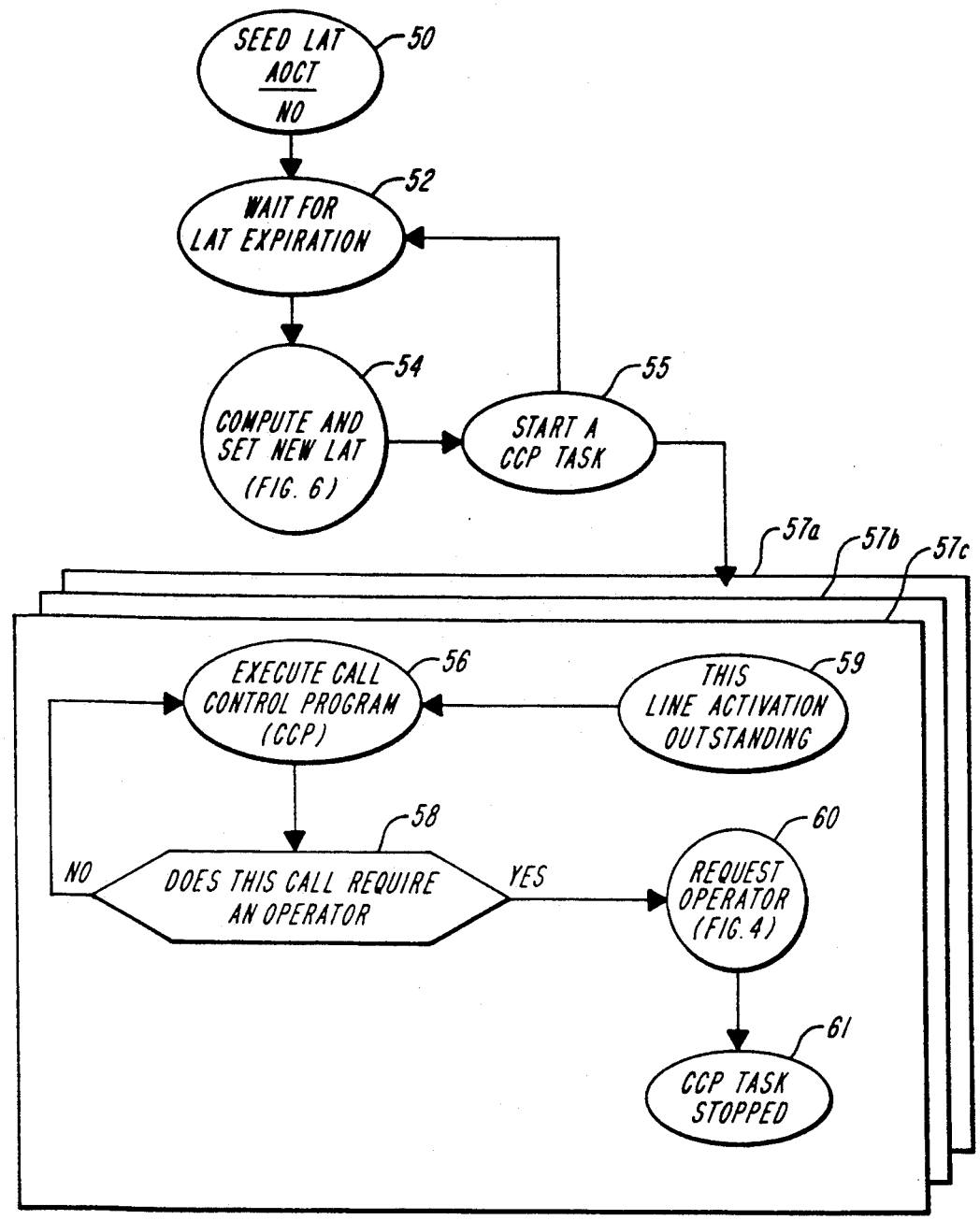
FIGS. 3–7 are flowcharts illustrating the operation of the call pacing system of the present invention.

The operation of the dynamically adjustable call pacing system of the present invention is shown in greater detail in FIGS. 3–7 wherein, beginning with FIG. 3, the Call Pacing System initializes or "seeds" the line activation time (LAT) with a value equal to the average operator connect time (AOCT) divided by the total number of operators (NO) connected to the system, step 50. For example, if a typical operator connect time were determined to be 60 seconds and there were 10 operators working the system, the initial line activation time value would be set for 6 seconds. Thus initially, an idle telephone line would be released to the call initiator/dialing pool every 6 seconds. A call control program then utilizes the coupled idle line to perform its required task such as dialing and connecting to an operator, or dialing and interactively requesting information from the person answering the call.

Upon the expiration of the line activation timer, step 52, the call pacing system according to the present invention proceeds to step 54 wherein a new line activation timer value is set and computed as will be described below and another Call Control Program task initiated, step 55. Multiple tasks such as task 57a–57c may run concurrently.

Within each task, an additional call control program, step 56, takes control of the idle line upon the outstanding line activation, step 59, to handle call connection and differentiation. For example, the call control program may differentiate and determine whether a call has been answered by a human or by an automated telephone answering machine.

Other functions of the call control program include determining if the line is busy, will not answer, or is no longer in service. A call control program can also be fully interactive, playing voice messages and getting responses from the called party by means of touch tones or voice responses.

The call control program also determines whether a given connected call requires an operator. For example, some calls might allow the customer to select and obtain information utilizing a touch tone telephone. If it is determined that an operator is required, step 58, processing continues to step 60 wherein a request for operator is made and the given call control Program task stopped, step 61. This processing is concurrent with computing and setting a new LAT, step 54.

Figure 4:
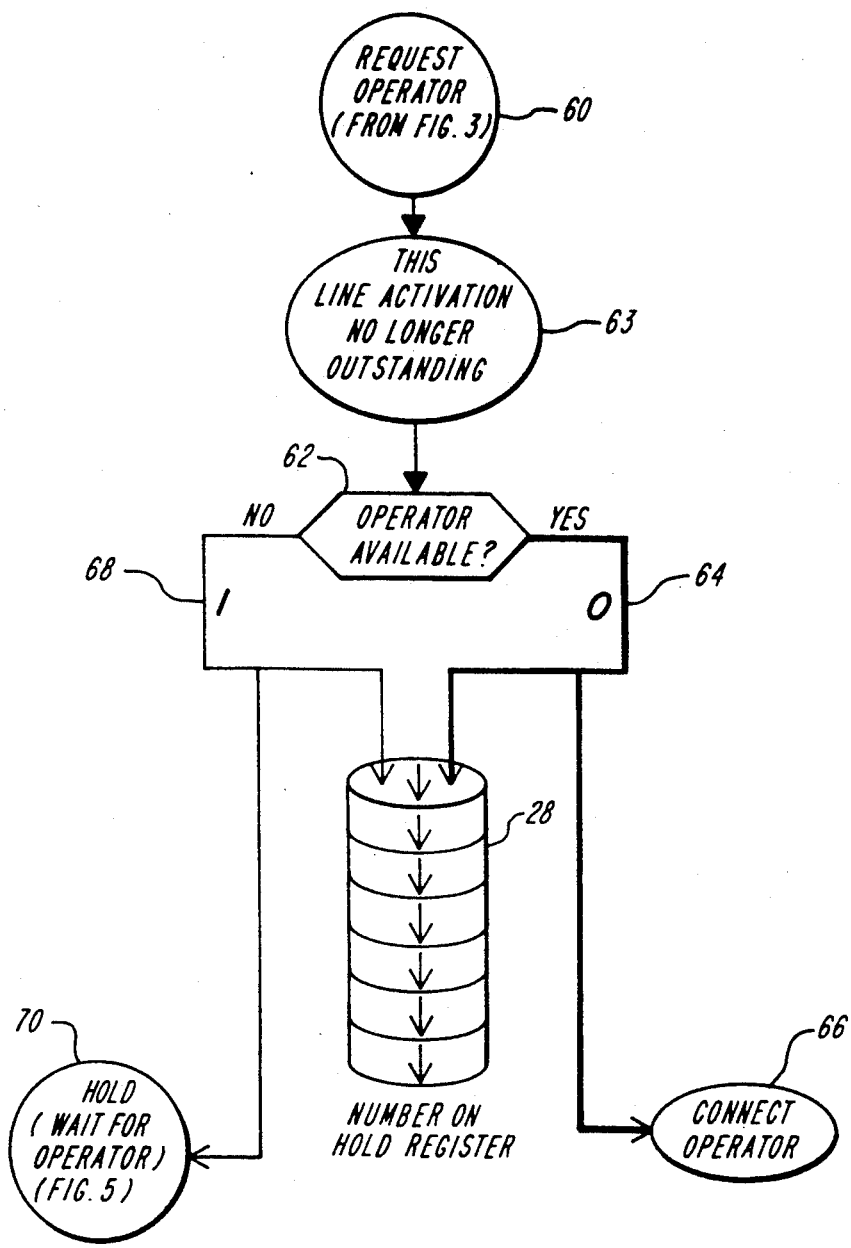

When an operator is requested and therefore a Line Activation is not longer outstanding, step 63 the operation of the dynamically adjustable call pacing system continues as shown in FIG. 4 wherein at step 62, the system determines whether an operator is available to handle the connected call. If an operator is available, processing continues to branch step 64 wherein a "0" is inserted in the Number On Hold register and the call connected to an operator, step 66. If an operator is not available, branch step 68, a "1" is inserted in the Number On Hold register 28 and the call must wait on hold for an operator, step 70.

Figure 5:
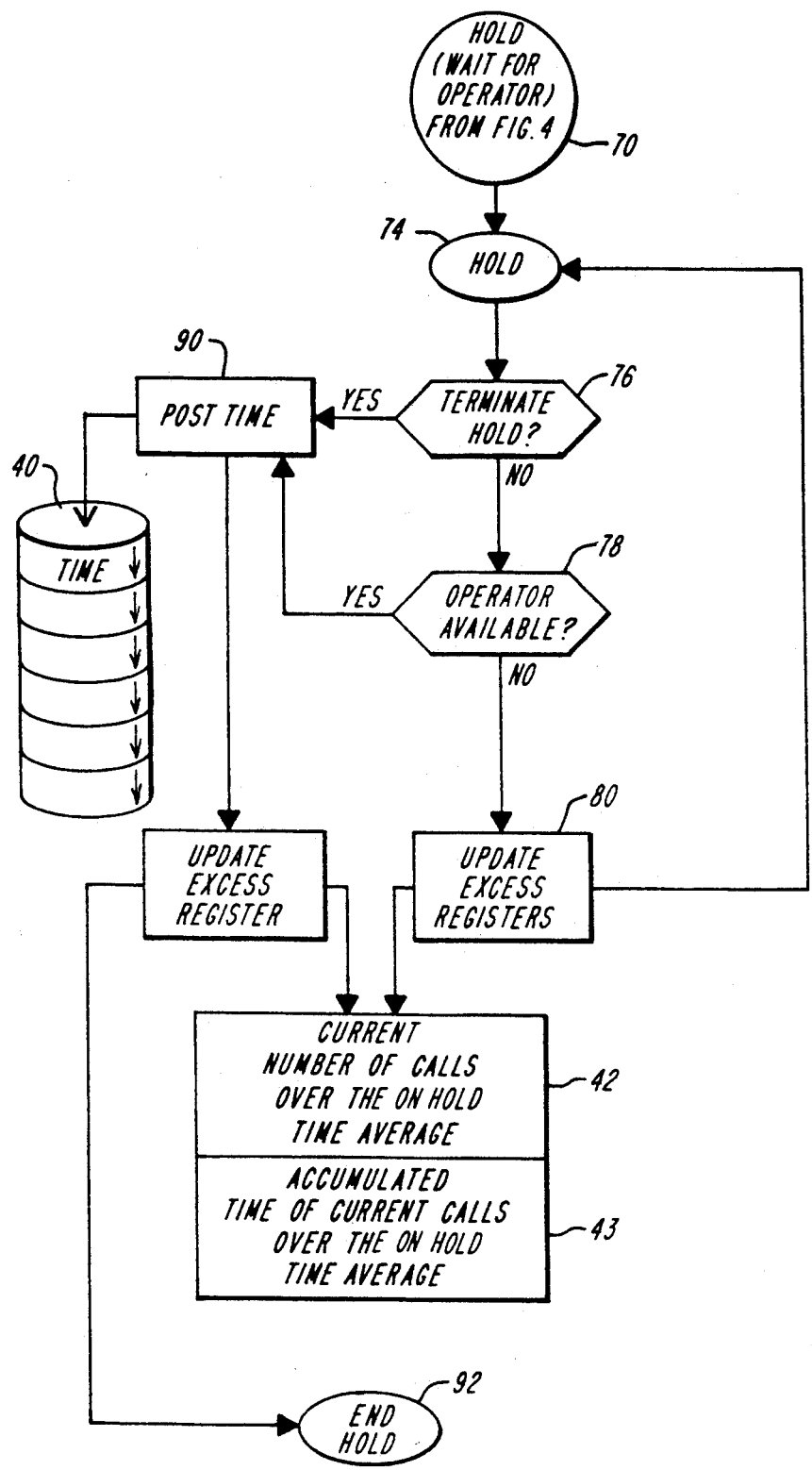

After placing a call on hold to await an operator, the call remains on hold at step 74, FIG. 5 while at step 76, the system inquires as to whether or not the hold has been terminated by an event such as the customer hanging up or the line being disconnected. If the hold is not terminated for those reasons, processing continues to step 78 wherein the system determines whether or not an operator is available to handle the call on hold.

If an operator is not available, the system updates the Excess Registers, step 80, namely, the Excess Hold Number register 42 and the Excess Hold Time Register 43 if the on hold time of this call is exceeding the previously computed AHT. Processing then returns to step 74 wherein the call remains on hold. The system is implemented to perform the steps 76, 78 and 80 upon the occurrence of an event or upon a timer interrupt. The updates of step 80 need not be done more frequently than approximately every 5 seconds.

When a hold is terminated at step 76 or an operator is available at step 78, the actual amount of time the call remained on hold is posted in hold time register 40, step 90, following which the call is removed from the Active On Hold Time Register 30, FIG. 2, and the excess registers 42,43 are recalculated if the call being removed from the Active On Hold register exceeds the OHTA. This ends the hold sequence, step 92.

As previously described in conjunction with FIG. 3, a new line activation time (LAT) value is computed, and set, upon the expiration of the previous line activation time. The steps of computing and setting the new value for the line activation time are shown in greater detail in FIG. 6.

Step 100 sets the current length of the delta LAT adjustments register 48. The length is set to the number of Line Activations Outstanding and therefore, the most recent delta LAT adjustment entries are used.

After computing the sum of all the previously calculated delta LAT adjustment values at step 102, the dynamically adjustable call pacing system of the present invention updates the Average Hold Time, step 104.

Figure 7:
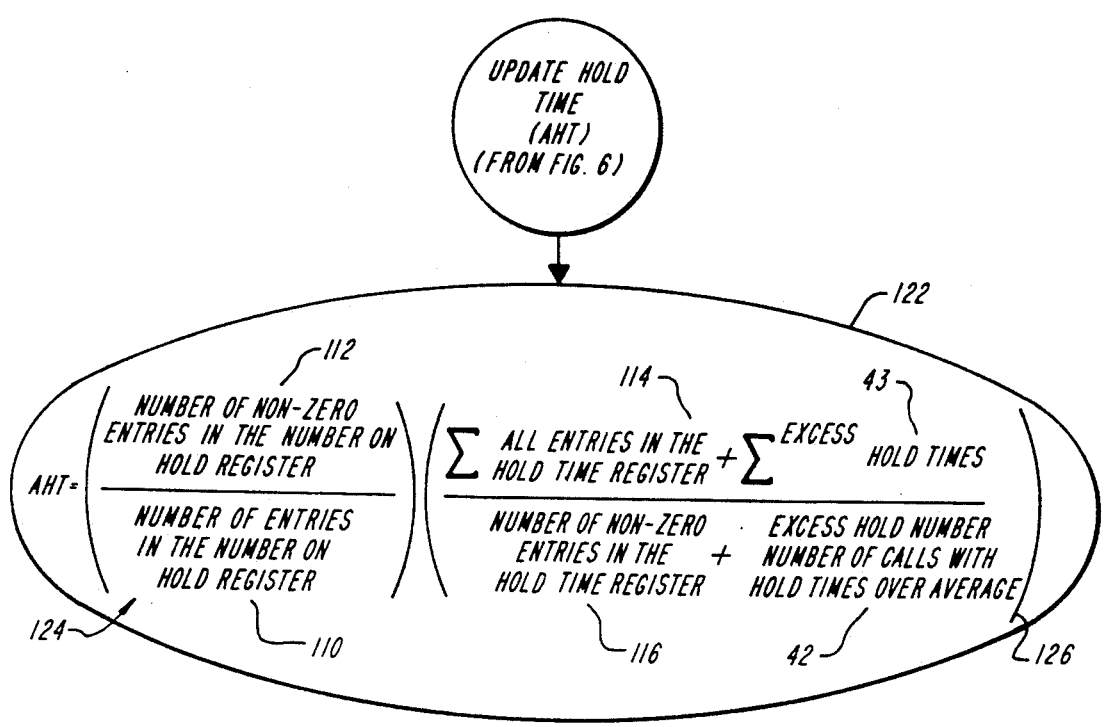

This step is shown in greater detail in Equation 122, FIG. 7. The first factor 124 is comprised of denominator 110 which is the total number of entries from the Number On Hold Register 28, FIG. 2. The numerator 112 is the value of the number of entries in the On Hold Register 28 that were actually placed on hold. Thus, in this example, a non-zero entry in On Hold Register 28 indicates that the call was actually placed on hold.

From the formula at step 122, it may be seen that the new Average Hold Time (AHT) is comprised of two factors. The first factor 124 yields the percentage of connected calls which are actually placed on hold. Factor 124 is then multiplies by the second factor 126. Second factor 126 accounts for both the historical on hold data as found in the Hold Time register 40, as well as for the current or "real time" data of current calls on hold as they exceed the current On Hold Time Average.

Factor 126 is comprised of value 114 which is the sum of all the hold times from the Hold Time register 40, FIG. 2, plus the sum of the Excess Hold times from Excess Hold Time register 43. The denominator 116, includes a value which is the sum of the number of non-zero entries in Hold Time register 40 plus the number of calls over the Average Hold Time as contained in the Excess Hold Number register 42. Thus, calls which are currently on hold longer than the Average Hold Time are immediately tracked, and this data used to update the Average Hold time even before the calls leave the hold queue.

Figure 6:
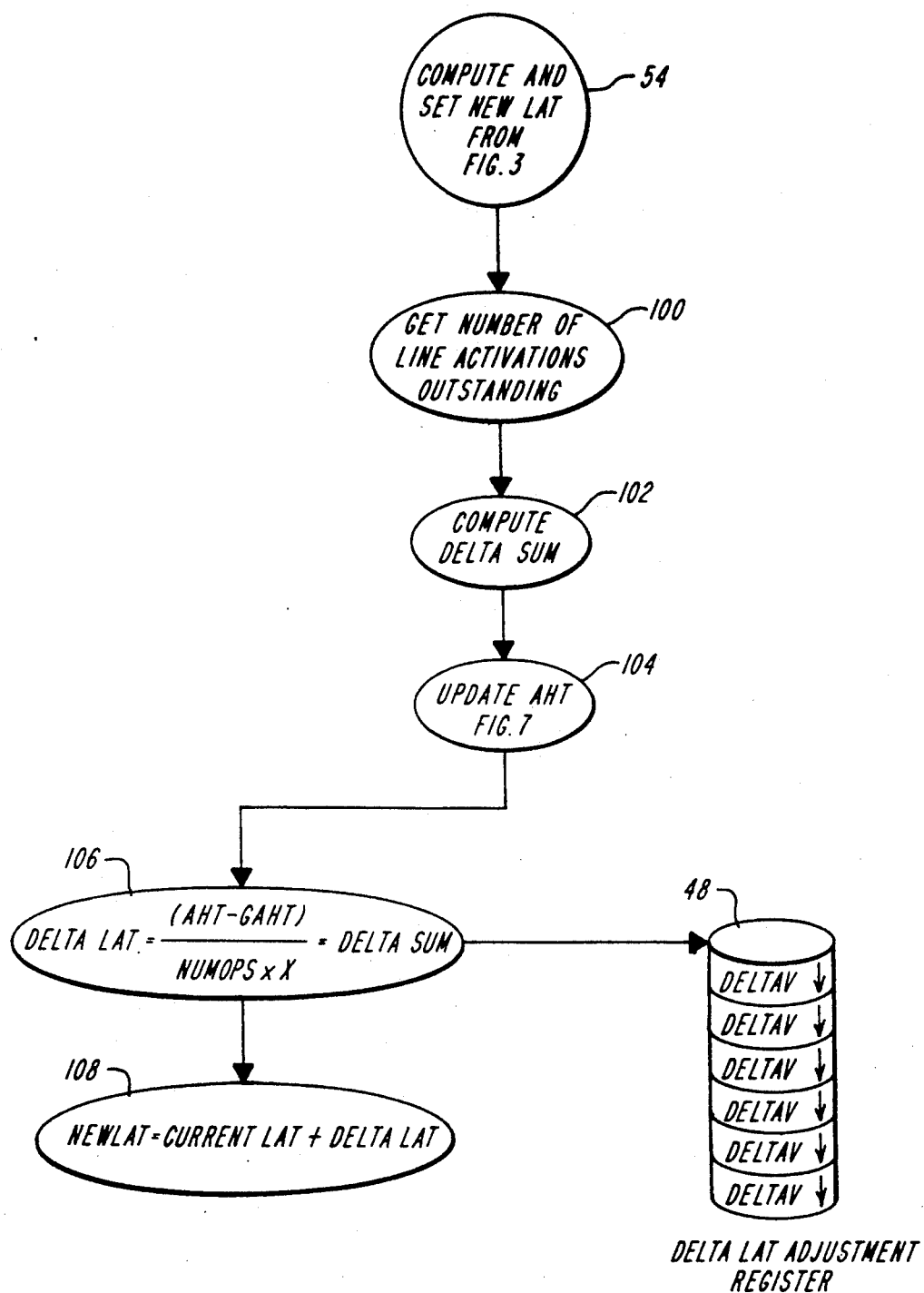

After computing the updated Average Hold Time, the operation of the dynamically adjustable call pacing system of the present invention resumes by computing the amount of change or "delta" line activation time (LAT) value by which the current LAT value must be modified, step 106, FIG. 6. The delta LAT value is computed by dividing the updated Average Hold Time minus the goal Average Hold Time by the number of operators currently working on the system times a scaling factor X. Example values for X range from 2 to 4. From this result is subtracted the value of delta SUM which is the total of the previously computed delta LAT adjustment values stored in the delta LAT adjustment register 48.

Thus, the system updates the current LAT value and simultaneously accounts for the predictive effects of previous delta LAT adjustment values which have been made but are not yet discernable as a change in the Average Hold Time. The delta LAT from step 106 is itself posted to the delta LAT adjustment register 48. Finally, at step 108, the system sets the new LAT value by adding the newly computed delta LAT value to the current LAT value.

Accordingly, the dynamically adjustable call pacing system of the present invention computes and updates the line activation time (LAT) value upon the expiration of the previous line activation time. Thus, the system is constantly updating the line activation time value taking into account the current calls on hold which have exceeded the computed On Hold Time Average, as well as the previous adjustments to the line activation time value which have, in all probability, not yet taken effect.

Modifications and substitutions by one of ordinary skill in the art are considered to be within the scope of the present invention which is not to be limited except by the claims which follow.

We claim:

1. A dynamically adjustable call pacing system, for regulating the frequency at which idle telephone lines are coupled to a telephone call initiator of an automated telephone system, comprising:
    a telephone call initiator, to which is sequentially coupled idle telephone lines, for initiating a telephone call over each of said idle telephone lines, and for providing a plurality of connected calls requiring operator assistance, each of said connected calls including a corresponding connected call record;
    telephone line gating means, responsive to a selectable frequency adjustment signal, for coupling idle telephone lines to said telephone call initiator at a selectably adjustable frequency;
    a connected call hold queue, coupled to said telephone call initiator, for storing a plurality of connected call records, each of said connected call records including indicia identifying a corresponding connected call, and providing an indication of how long said connected call record has been stored in said hold queue; and
    a call pacer, responsive to said connected call hold queue call record indication of how long each of said corresponding call records has been stored in said hold queue, to historical on hold time data, to excess on hold time data, and to at least one previous telephone line gating means selectable frequency adjustment, for determining a current Average Hold Time, and responsive to said current Average Hold Time and to a goal Average Hold Time, for providing an adjustment to the selectably adjustable frequency at which said idle telephone lines are coupled to said telephone call initiator by said telephone line gating means.

2. The system of claim 1 wherein said telephone call initiator includes call dialer means.

3. The system of claim 2 wherein said call dialer means is responsive to a source of selected telephone numbers.

4. The system of claim 1 further including means for detecting an answered call.

5. The system of claim 1 further including a plurality of operators, any one of said plurality of operators for answering a connected call.

6. The system of claim 5 further including means for determining the availability of fan operator to answer a connected call.

7. The system of claim 1 further including means, responsive to said call record indicia providing an indication of how long the corresponding call record has been stored in said hold queue, for selectively connecting calls on hold to an available operator according to predetermined priority criteria.

8. The system of claim 7 wherein said hold queue is prioritized into a plurality of priority categories according to said predetermined priority criteria.

9. The system of claim 1 wherein said call pacer determines said current Average Hold Time after first determining the current number of connected calls and the total accumulated times of the current connected calls exceeding a previously determined On Hold Time Average.

10. The system of claim 1 wherein said call pacer determines said Average Hold Time according to the formula:

$$AHT = \frac{\text{Tot holds}}{\text{POH Size}} \times \frac{\text{Tot time} + \text{Tot } xcess}{\text{Ht size} + \text{Xcess size}}$$

where
    AHT = Average Hold Time,
    Tot holds = The total number of connected calls in a number on hold register which were actually placed on hold,
    POH Size = The number of entries in the on hold register,
    Tot time = The total time during which all of the connected calls waited on hold as determined from a hold time register,
    Ht size = The number of entries in the hold time register,
    Tot xcess = The total time in excess of an On Hold Time Average, of all the currently connected calls which have been on hold longer than the On Hold Time Average, and
    Xcess size = The current number of connected calls which have been on hold longer than the On Hold Time Average.

11. The system of claim 1 wherein said call pacer establishes a line activation time value, for regulating the selectably adjustable frequency at which said idle telephone lines are coupled to said telephone call initiator; and wherein at the expiration of said line activation time value, said telephone line gate means couples an idle telephone line to said telephone call initiator.

12. The system of claim 11 wherein said call pacer calculates an adjustment to the line activation line value upon the expiration of a previous line activation time.

13. The system of claim 12 wherein a new line activation time value equals a previous line activation time value plus said line activation time value adjustment.

14. The system of claim 13 wherein said line activation time value adjustment is calculated according to the formula:

$$\text{DELTA LAT} = \frac{(AHT - GAHT)}{NUMOPS \cdot X} - \text{DELTA SUM}$$

where

DELTA LAT = the adjustment value to be added to the current line activation time value;
AHT = the Average Hold Time of a connected call;
GAHT = the automated telephone system goal Average Hold Time;
NUMOPS = the number of operators currently servicing the automated telephone system;
X = a scaling factor; and
DELTA SUM = the total of N previously computed Delta LAT values.

15. A dynamically adjustable call pacing system, for regulating the frequency at which idle telephone lines are coupled to a telephone call initiator of an automated telephone system, comprising:

a telephone call initiator including call dialer means, to which is sequentially coupled idle telephone lines at a selectable frequency, and responsive to a source of selected telephone numbers, for selectively initiating a telephone call over said sequentially coupled idle telephone lines, and for providing a plurality of connected calls requiring operator assistance;

means for detecting a connected call;

means for determining the availability of an operator to answer a connected call;

a connected call hold queue, for storing a plurality of connected call records, each of said connected call records including indicia identifying a corresponding connected call, and providing an indication of how long said connected call record has been stored in said hold queue; and a call pacer, for determining the Average Hold Time that a call record remains stored in said hold queue, and responsive to said Average Hold Time and to a goal Average Hold Time, for regulating the selectable frequency at which said idle telephone lines are coupled to said telephone call initiator, and wherein said call pacer determines said Average Hold Time according to the formula:

$$AHT = \frac{\text{Tot holds}}{POH \text{ Size}} \times \frac{\text{Tot time} + \text{Tot xcess}}{Ht \text{ size} + Xcess \text{ size}}$$

where

AHT = Average Hold Time,
Tot holds = The total number of connected calls in a number on hold register which were actually placed on hold,
POH = the size of the number on hold register,
Tot time = The total time during which all of the connected calls waited on hold as determined from a hold time register,
Tot xcess = The total time over the Average hold Time, of all the currently connected calls which have been on hold longer than a previously computed Average Hold Time,, and
Xcess size = The current number of connected calls which have been on hold longer than the previously computed Average Hold Time.

16. A dynamically adjustable call pacing system, for regulating the frequency at which idle telephone lines are coupled to a telephone call initiator of an automated telephone system, comprising:

a telephone call initiator, to which is sequentially coupled idle telephone lines, for initiating a telephone call over each of said idle telephone lines, and for providing a plurality of connected calls requiring operator assistance, each of said connected calls including a corresponding connected call record;

telephone line gating means, responsive to a line activation time value, for coupling idle telephone lines to said telephone call initiator at a selectably adjustable frequency;

a connected call hold queue, coupled to said telephone call initiator, for storing a plurality of connected call records, each of said connected call records including indicia identifying a corresponding connected call, and providing an indication of how long said connected call record has been stored in said hold queue; and a call pacer, responsive to said hold queue call record indication of how long each of said corresponding call records has been stored in said hold queue, to historical on hold time data, to excess on hold time data, and to at least one previous line activation time value (LAT) adjustment, for determining a current Average Hold Time, and responsive to said current Average Hold Time and to a goal Average Hold Time, for providing an adjustment to the line activation time value at the expiration of which said idle telephone lines are coupled to said telephone call initiator by said telephone line gating means, wherein said line activation time value adjustment is calculated according to the formula:

$$\text{DELTA LAT} = \frac{(AHT - GAHT)}{NUMOPS \cdot X} - \text{DELTA SUM}$$

where

DELTA LAT = the adjustment value to be added to the current line LAT value;
AHT = the Average Hold Time of a connected call;
GAHT = the automated telephone system goal Average Hold Time;
NUMOPS = the number of operators currently servicing the automated telephone system;
X = a scaling factor; and
DELTA SUM = the total of N previously computed Delta LAT values.

* * * * *